No. 759,352. PATENTED MAY 10, 1904.
L. P. DÉCOMBE.
METER FOR MEASURING ELECTRICAL ENERGY.
APPLICATION FILED NOV. 26, 1901.
NO MODEL. 2 SHEETS—SHEET 1.
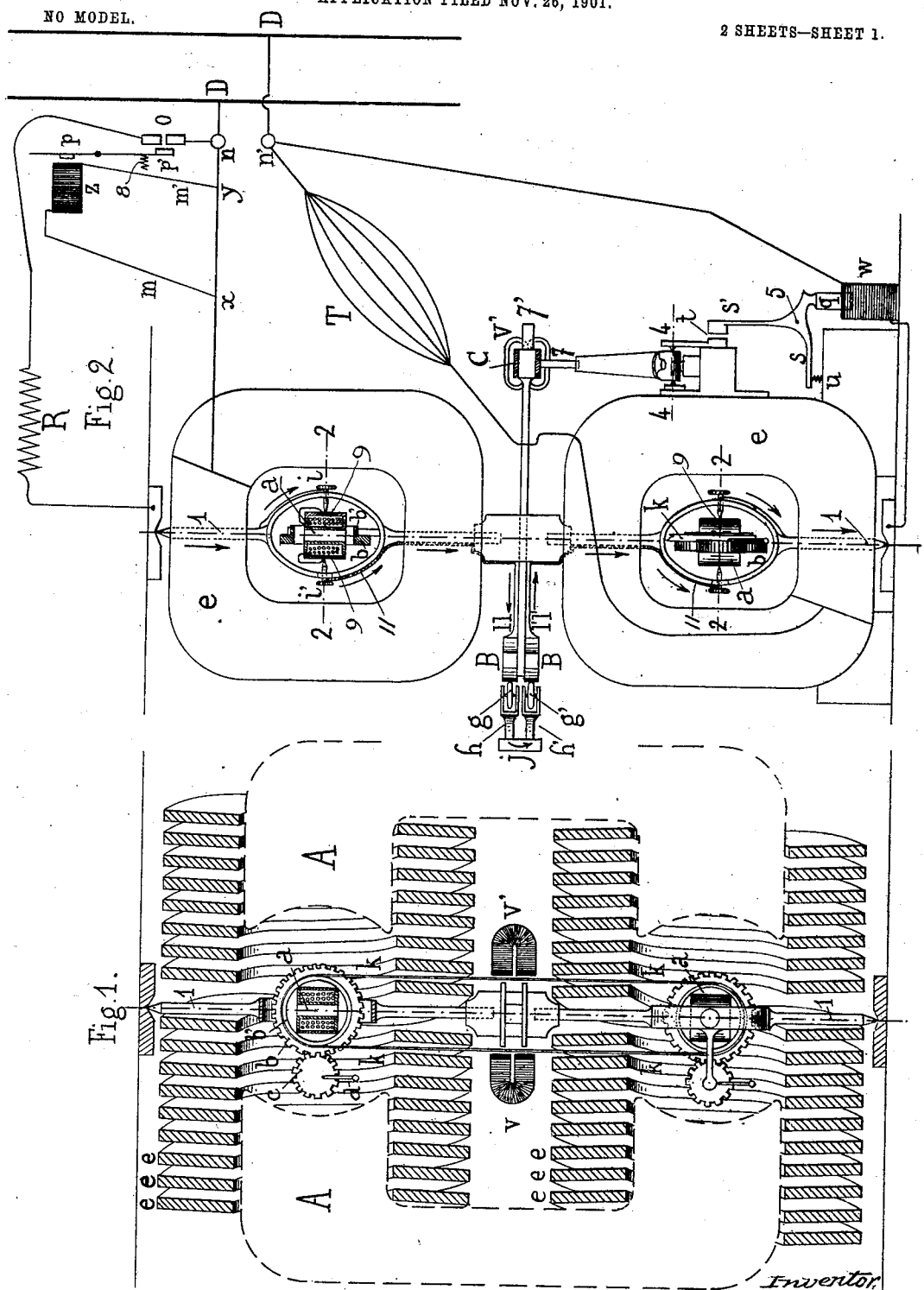
Inventor
Louis Philibert Décombe
By his attorney H. S. Mackaye No. 759,352. PATENTED MAY 10, 1904.
L. P. DÉCOMBE.
METER FOR MEASURING ELECTRICAL ENERGY.
APPLICATION FILED NOV. 26, 1901.
NO MODEL. 2 SHEETS—SHEET 2.
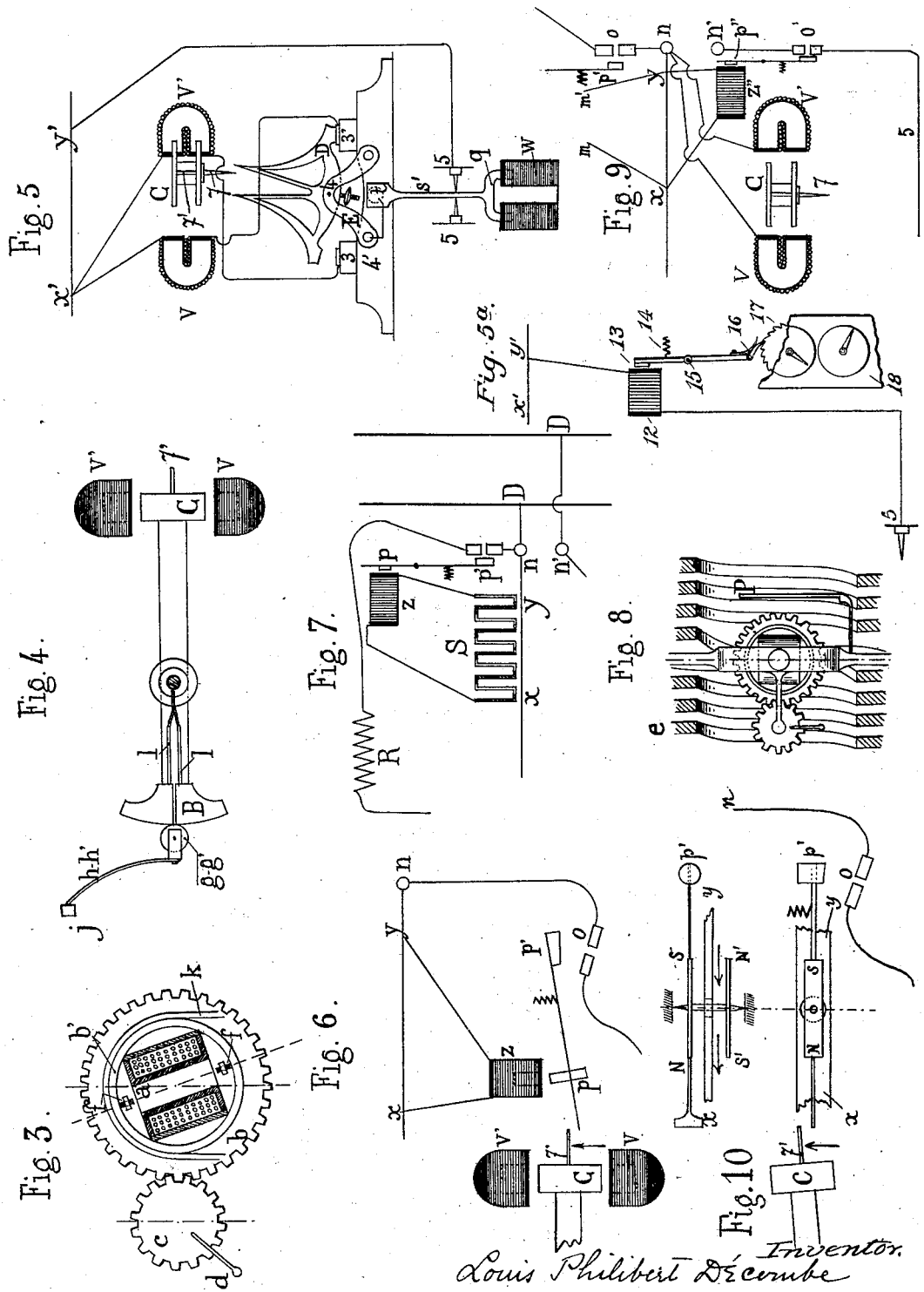

No. 759,352. Patented May 10, 1904.

UNITED STATES PATENT OFFICE.

LOUIS PHILIBERT DÉCOMBE, OF PARIS, FRANCE.

METER FOR MEASURING ELECTRICAL ENERGY.

SPECIFICATION forming part of Letters Patent No. 759,352, dated May 10, 1904.

Application filed November 26, 1901. Serial No. 83,717. (No model.)

*To all whom it may concern:*

Be it known that I, LOUIS PHILIBERT DÉCOMBE, professor, a citizen of the Republic of France, residing at 4 Impasse Reille, Paris, Seine, in the Republic of France, have invented certain new and useful Improvements in Meters for Measuring Electrical Energy, of which the following is a specification.

This invention relates to a new electric-energy meter applicable to direct, alternating, polyphase, &c., currents distributed at constant potential or with constant strength or with potential and strength both variable.

The apparatus comprises, like most apparatuses of the kind, a spool of fine wire, (in shunt to the terminals of the distribution,) subject to a magnetic field created by a solenoid traversed by the translation-current; but in the present invention this spool forms part of a system arranged in such a manner that it oscillates on a suitable axis, the number of oscillations being proportional to the energy consumed in the distribution. It is therefore sufficient simply to register these oscillations. This apparatus presents, moreover, the advantage that it starts or excites itself automatically—that is to say, that the derived or shunt current in the spool or coil of fine wire only circulates when once the consuming apparatus has come into operation—which constitutes considerable economy of energy for the central station.

In order that this invention may be readily understood, the same is illustrated in the accompanying drawings, in which—

Figure 1 is a vertical section of a solenoid traversed by the translation-current, together with all the parts which oscillate and with two small solenoids or electromagnets which serve to maintain the oscillations. Fig. 2 is an elevation of the same at right angles to the plan of the section of Fig. 1, showing connections and arrangement for opening and closing the shunt-current flowing between the terminals when the last translating device is removed from circuit and the first one placed in circuit. Fig. 3 is an axial section of the coil shunted to the terminals, together with the parts which it controls. Fig. 4 is a plan of a member which contributes to the maintenance of the oscillations. Fig. 5 illustrates the distributer for maintaining the oscillations. Fig. $5^a$ shows one form of registering device in diagram. Fig. 6 shows arrangement adopted for giving oscillating system an initial impact. Fig. 7 shows one means for opening and closing the shunt-current flowing between the terminals when the last translating device is removed from circuit and the first one placed in circuit. Fig. 8 shows one means for limiting amplitude of the oscillations. Fig. 9 shows one modification in connections of the distributer. Fig. 10 shows one means for giving the oscillating system an initial impact and for opening and closing the shunt-current of oscillating system when the last translating device is removed from circuit and the first one placed in circuit.

Referring to Figs. 1 and 2, the solenoids traversed by the translation-current are indicated by $e$. The solenoid comprises a conducting-strip which is wide and thin, thereby possessing the advantage of increasing the number of ampere-turns for a given current. Soft-iron pole-pieces A may be placed in the solenoids, as oftentimes is the case, for the purpose of increasing the field of force. There are two solenoids, which are similar, but which are traversed in opposite directions by the translation-current, and two bobbins $a\,a$, the fine-wire coils of which, wound in opposite directions, are traversed by a shunt-current flowing between the terminals $n\,n'$ of the system, Fig. 2. A suitable auxiliary resistance R without self-induction is inserted in the shunt-circuit. The two bobbins $a\,a$ may, moreover, be arranged in series in the shunt-circuits (this is the case in the drawings) or in a separate shunt-circuit between the terminals of the system. Each of these bobbins can revolve round an axis 2 2, perpendicular both to its geometrical axis and to the magnetic field to the corresponding solenoid. Each bobbin is inclosed in a ring $b$, Fig. 1, which is integral with or rigidly connected with the said bobbin and which engages by any suitable means (toothed gearing, friction-gearing, cords, elastic or not, depending on the roughness of the periphery, or fixed at certain points to the ring $b$ and disk $c$ in such a manner as to permit a rotation of ninety degrees for the bobbin *a*) with a disk *c*, which carries a counterweight *d* of suitable amount. The diameter of the disk *c* is exactly half that of the ring *b* in such a manner that the angular rotation of the disk *c* is two times that of the ring *b*. In the state of rest of the apparatus the axis of the bobbin is vertical, and the radius-arm of the disk *c*, on which is placed the counterweight *d*, is also vertical. The two bobbins *a a* are caused to move together by any suitable means—for example, by means of a flexible chain, a cord *k*, wound upon the two rings *b'*, which are integral with or are rigidly connected with the bobbins, the chain or cord being fixed at one point of each ring, or any other equivalent arrangement. Under these conditions the effects of the opposed fields due to the two solenoids on the system of the two bobbins add together, while those of any exterior field whatever (and in particular the earth's field) cancel each other. Both bobbins are carried by the same support movable around an axis 1 1, perpendicular both to the magnetic field of the solenoids and to the axis 2 2. Each bobbin should have, if it is full and homogeneous, a length L, related to the radius of its base by the formula $L = R\sqrt{3}$, and if it is hollow (but still homogeneous) by the formula $L = \sqrt{R^2 + r^2} \times \sqrt{3}$, *r* designating the internal radius of the bobbin (this is the case of the drawings) and R its external radius. Those dimensions are the most favorable which allow the moment of inertia of the bobbins to be constant. Small additional masses *f f*, Fig. 3, can be displaced along screw-threads and allow the bad homogenity of the bobbins to be exactly compensated by the process which is hereinafter described.

In Fig. 2, *i i'* are screws serving as pivott for the bobbin *a* and by which a shunt-currens flowing between the terminals *n n'* of the distribution (which follows at first the metallic axle 1 1) is conducted to and from the bobbin *a* in the direction indicated by the arrows. The screw *i'* is insulated from the piece which supports it. The screw *i* is, on the contrary, in electric contact with this piece. Each of the extremities of the winding of the bobbin *a* is electrically connected, moreover, with a small metallic piece 9, fixed on the cylindrical insulating-sleeve which surrounds this bobbin and hollowed conically where the points of the screws *i* and *i'* enter. It is obvious that these small pieces must not communicate electrically with one another. The other parts of Fig. 2 are seen more readily in Figs. 4 and 5, which will now be described.

In Fig. 5, V and V' represent two small solenoids or two electromagnets, which are adapted while acting upon an astatic system of two magnets C or even simply on a piece of soft iron to produce at each oscillation the necessary impulse for maintaining the oscillations. To this end the astatic system of magnets C (or the piece of soft iron) is carried at the end of a horizontal piece, Figs. 2 and 4, perpendicular to the axis 1 1 and forming one piece with or rigidly connected with this axis. The other end of this piece carries a system of four metallic sectors B, (two upper sectors separated from one another by an insulating material and two lower sectors separated from the upper sectors by an insulating material.) The edge of these sectors is circular, (it has as its center the axis 1 1,) and it rests against the metallic rollers *g g'*, which are vertically pivoted and are carried on the ends of elastic blades *h h'*, communicating metallically with the piece *j*, which blades are allowed to press said rollers very lightly against the sectors. Conducting-strips *l l l' l'*, Figs. 2 and 4, permit the shunt-current to pass, on account of the system of rollers, from the upper bobbin to the lower bobbin and to be interrupted just at the moment when the oscillating system passes its mid-position.

Fig. 5 (and also Fig. 2) shows a form of distributer movable round a horizontal axis 4 4. This distributer engaged at each oscillation by the pallet 7, fixed to the lower part of the horizontal piece previously described, rests alternately upon the metallic contacts 3 3' and causes the current which is to produce the impulse on the piece C to flow either through the solenoid V or through the solenoid V'.

In Figs. 5 and 2 is shown a reciprocating lever *q s s'*, terminated by an astatic magnet *q* or a piece of soft iron. W is a solenoid or electromagnet traversed by the shunt-current passing between the terminals and through the coils *a a*. Finally, Fig. 2 shows the arrangement adopted for obtaining automatic excitation. Z is a solenoid or electromagnet, and *p* a piece of soft iron or a small astatic electromagnet situated at one of the ends of a lever of which the other end (which carries a metallic piece for closing at *o* the shunt-circuit between the terminals *n* and *n'*) is controlled by a light spring 8. D D indicate the street-mains, and T the translating devices.

The conductor which directly joins *x* and *y* in the drawings is to be understood as only diagrammatically shown and as representing a conductor of sufficient resistance to cause enough flow of current through the magnet *z* to operate the shunt-closing switch. If necessary, devices for increasing the resistances between *x* and *y* may be employed.

Before describing the method of operation of the apparatus the method in which it is regulated will now be described. The oscillating system (previously withdrawn from the solenoids *e e*) is suspended by a torsion-thread which must be exactly in the prolongation of the axis 1 1. In order to realize this condition, it is in general necessary to add auxiliary counterweights to the system. The system is then caused to oscillate around the suspension-thread as a true torsion-pendulum. (The oscillations take place in a plane perpendicular to the suspension-thread and to the axis 1 1, which is a prolongation of it.) Previously each bobbin $a$ has been balanced accurately around its axis of rotation 2 2 in such a manner that the counterweight $d$ being removed the system of the bobbin $a$, the ring $b$, and the disk $c$ are in equilibrium for all positions of the bobbin about the axis 2 2. The counterweight still being removed, it is necessary to obtain by trial and error the result that the suspended system always executes the same number of oscillations during the same time whatever be the position of the bobbin $a$ around the axis 2 2. In virtue of the particular relative dimensions given to each bobbin the condition in question is always almost realized and it is sufficient in order to obtain it exactly to adjust the small masses $f f$ in a proper manner. This condition is at first realized for a single bobbin, (the other being removed, for example, or held fixed,) then for the second, it being unnecessary now to trouble about the first. The method of operation of the apparatus can now be understood. Immediately after the translation-circuit has been closed by means of the usual switching apparatus a part of this current (which can be diminished by means of a suitable resistance inserted in $m$ or $m'$ or increased by substituting a resistance for the portion $x y$ of the conductor) traverses the solenoid or electromagnet Z, attracts the opposite piece, which is a piece of soft iron or preferably an astatic magnetized system, and causes a lever $p'$ to swing and to close at $o$ the shunt-circuit between the terminals $n$ $n'$ of the system. The pieces can besides be arranged in such a manner, Fig. 6, that in their movement the extremity of the lever drives the pallet 7' from its mid-position, which constitutes the initial impulse necessary for the excitation of the apparatus. A circuit being once closed at $o$, the current flowing from $n$—for example, Fig. 2—flows down the resistance R and the axis 1 1, arrives at the bobbin $a$ through the screw $i$, passes therefrom through the screw $i''$, flows down the length of the axis by means of an insulated wire 11, arrives at the conducting-strips $l l$, passes to the strips $l' l'$ by means of the sectors B and rollers $g g'$, previously described, which establish the connection between the upper strips and the lower strips, then descends into the second bobbin $a$, which it traverses in the same manner as the first, and arrives finally at the terminal $n'$ after having traversed the solenoid W, the use of which is hereinafter described. Under the action of the force due to the magnetic field created by the solenoid $e e e$ the bobbin $a$ becomes inclined at a certain angle, limited by the contrary action of the counterweight $d$. This same force, on the other hand, evidently tends to bring the system, which is movable, around the axis 1 1 into its mid-position—that is to say, into the plane containing the axis of the solenoids $e$, Fig. 1, and the axis 1 1. In reality it brings it there; but the system carried on by its acquired velocity passes beyond its mid-position, passes on through a certain angle, then returns in an opposite direction, again passing beyond it (still under the action of the force due to the magnetic field)—that is to say, executes from one side to the other of this position one series of oscillation, the number of which is proportional to the energy consumed. If there were no friction and no resistance offered by the air, the oscillations would have an infinite duration. This is not, however, the case. It is necessary, then, to maintain the oscillations and for this purpose to communicate an impulse to the horizontal piece of the oscillating system. In this instrument this impulse is given by means of the solenoids or electromagnets V V' at the precise moment when the movable system passes through its mid-position. At this moment the rollers $g g'$, Figs. 2 and 4, are no longer in contact with the sectors, but with the insulating material which separates them. The shunt-current is then interrupted for a very short instant and the swinging lever $q s s'$, Figs. 2 and 5, being no longer held by the solenoid or electromagnet W moves under the action of the spring $u$. The arm $s'$ then establishes at $t$ a metallic contact which permits a part of the translation-current to flow through the metallic circuit $x'$ V 3' D 4 E 4' $t$ S 5 $y'$—that is to say, to produce on the astatic magnetized system fixed to the horizontal piece $a$ a slight impulse in the desired direction. ($x' y'$ is a part of the translation-circuit.) On continuing its oscillation the piece C (by means of the pallet 7) engages the distributer, which is caused to rest on the metallic contact 3. On the following oscillation the circuit is closed through V'. It may be added that in certain cases it may be advantageous to connect the circuit for the maintenance of the oscillation system to the main terminals themselves, as it may be seen, Fig. 9. In order to close this circuit for this current (like that in the bobbins $a$) at the precise moment of the putting into operation of the consuming apparatus, a lever $p''$ is used, (attracted by a solenoid Z'', shunted at $x y$ on the translation-conductor.)

This instrument operates with alternate currents, polyphase currents, &c., quite as well as with continuous currents by introducing appropriate modifications well known to those skilled in the art. It might be necessary to furnish the movable system with a metallic plate P, Fig. 8, which, following the movement of the system while normally cutting the lines of the magnetic force produced by the solenoids $e$, will create an artificial resistance able to maintain the amplitude of the oscillations almost constant. The heat which a current develops in a conductor can be utilized in a practical manner either for the excitation of the apparatus or for the maintenance of the oscillations. There are placed in the immediate vicinity of the principal translation-conductor or of a resistance, if such is needed, inserted in this conductor the even junctions of a thermo-electric pile S, Fig. 7, the odd junctions of which may be arranged in the surrounding space. The developed heat generates in the closed circuit of the pile a current which may replace the shunt-current between $x'y'$ for the maintenance of the oscillations or the shunt-current between $x y$ for the starting of the apparatus. In the vicinity of the translation-circuit $x y$ a magnetized nearly astatic system, Fig. 10, may be also arranged so that it deviates as the current flows in the translation-circuit. In the same time it closes at $o$ by means of a piece $p'$ the shunt-current passing through the oscillating system, and it gives the piece $e'$ an initial impact. In order to register the oscillations—that is to say, in order to register the energy consumed—the current flowing alternately in the circuits of the electromagnets V V' may be employed to actuate the registering system, which may be of any suitable kind. For instance, the current which passes at each oscillation through one of the magnets V or V' is made to pass on its way from $y'$ through the coils of a magnet 12, Fig. 5$^a$, which magnet attracts an armature 13 on a lever pivoted at 15 and controlled by a spring 14, which lever carries a pawl 16, engaging a ratchet-wheel 17 for driving an appropriate train of registering-gear 18.

Having now particularly described and ascertained the nature of my invention and in what manner the same is to be performed, I declare that what I claim is—

1. In an electric meter and in combination with means for starting, maintaining and counting oscillations, an oscillatory support movable around an axis as 1 1 and supporting a shunt-bobbin movable by an axis as 2 2 which is at right angles both to the axis 1 1 and to the bobbin-axis, and a counterbalance-disk as $c$ geared to said bobbin so as to always turn through twice the angle described by said bobbin, said bobbin being so proportioned and balanced that the support will swing in equal times under the influence of equal force whatever be the position of the bobbin around the axis 2 2, substantially as described.

2. In an electric meter, two fixed coils, an oscillatory support two tilting coils on said support and electric circuits passing through all of said coils so as to produce oscillatory tendencies on said support through the two tilting coils; in combination with means connecting said tilting coils to make them tilt together and means for counting the number of oscillations of said support, substantially as described.

3. In an electric meter, an oscillating support, shunt-coils pivoted so as to tilt on said support and counterweighted disks geared to said coils so as to control their degree of tilting, substantially as described.

4. In an electric meter, an oscillatory support, a bobbin carried thereby and movable on an axis, as 2 2, at right angles to its own axis and to the axis of oscillation, said bobbin being proportioned and balanced substantially as described, so as to compensate its heterogeneity, substantially as described.

5. In an electric meter, an oscillatory support, a tilting bobbin thereon, and a counterbalance-disk geared to said bobbin so as to turn through twice the angle described by said bobbin, substantially as described.

6. In an electric meter, an oscillatory support, circuit-controlling sectors carried thereby, fixed contact devices coöperating therewith to maintain circuit through said support except in a middle or neutral position, electromagnetic means for imparting a momentary impulse to said support one way or the other and means in the circuit governed by said sectors for determining the moment of operation of said impulse-giving means, substantially as described.

7. In an electric meter, an oscillatory system, circuit-controlling sectors attached thereto, electromagnets as V, V' adapted to pull said oscillating system one way or the other, a circuit-changer pivoted, as at 4, for throwing current into one or the other of said magnets in turn, said circuit-changer being operated by movement of said oscillating system and electromagnetic means controlled by a circuit through said sectors for periodically admitting current to said magnets V, V', substantially as described.

8. In an electric meter, an oscillatory system, circuit-controlling sectors attached thereto, electromagnetic means for imparting suitable impulses to the oscillatory system, a switch for periodically closing circuit through said last-named means and an electromagnet in circuit with and controlled by said sectors and acting when energized to hold said switch open, substantially as described.

9. In an electric meter, a fixed coil, a movable coil, an oscillatory support for the latter, circuits connecting both of said coils with the translating devices, electromagnetic means for imparting periodic impulses to said oscillatory support, an electromagnetic switch for controlling said last-named means and a circuit-interrupter operated by movement of said oscillatory support, said interrupter being in circuit with the movable coil and with the electromagnetic switch, substantially as described.

10. In an electric meter, an oscillatory system, a pivoted lever for imparting an initial impact to said system, a circuit-closer for said meter, controlled by said lever and electromagnetic means in circuit with the translating devices for moving said lever around its pivot so as to at once close the meter-circuit and start its oscillation, substantially as described.

11. In an electric meter, an oscillatory system, a circuit-closing lever for the meter so placed as to give said system an initial impact when operated and an astatic magnetic system mounted on said lever in operative relation to a portion of the circuit through the translating devices, whereby closing of circuit through said devices, will tilt said lever so as at once to close the meter-circuit and give its oscillatory system an initial impact, substantially as described.

12. In an electric meter, an oscillatory system, a pivoted lever for giving the same an initial impact and an astatic magnetic system mounted on said lever in operative relation to a portion of the circuit of the translating devices, for tilting said lever, substantially as described.

13. In an electric meter, two fixed coils a separate movable tilting coil in the magnetic field of each fixed coil, a common oscillatory support for said tilting coils and electric circuits traversing all of said coils in such a direction that said tilting coils shall be oppositely affected by any exterior source of magnetism, substantially as described.

14. In an electric meter, two fixed coils, two tilting coils, a common oscillatory support for said tilting coils, means connecting said coils to insure equal and simultaneous tilting thereof and circuits through all of said coils so directed that said two tilting coils shall be oppositely affected by any exterior magnetic field, substantially as described.

15. In an electric meter, a shunt-coil, an oscillatory support therefor a fixed series coil and a metallic plate carried by said support and fixed thereon at right angles to the lines of force of the series coils so as to maintain a substantially uniform amplitude of vibration of said support, substantially as described.

In witness whereof I have hereunto signed my name this 15th day of November, 1901, in the presence of two subscribing witnesses.

LOUIS PHILIBERT DÉCOMBE.

Witnesses:
AUGUSTE JOURNOL,
WALTHER HARTMANN.